United States Patent Office 3,490,620
Patented Jan. 20, 1970

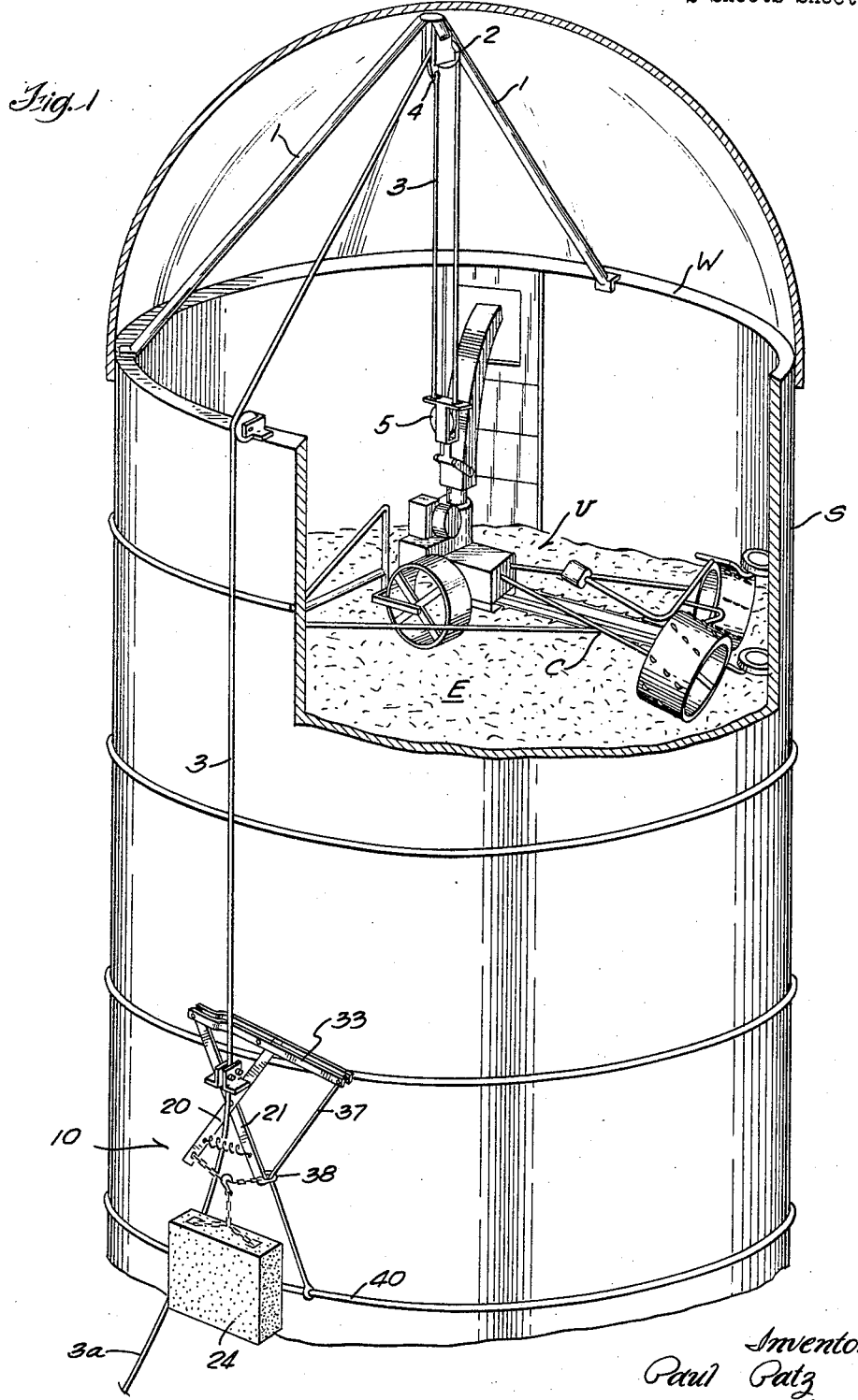

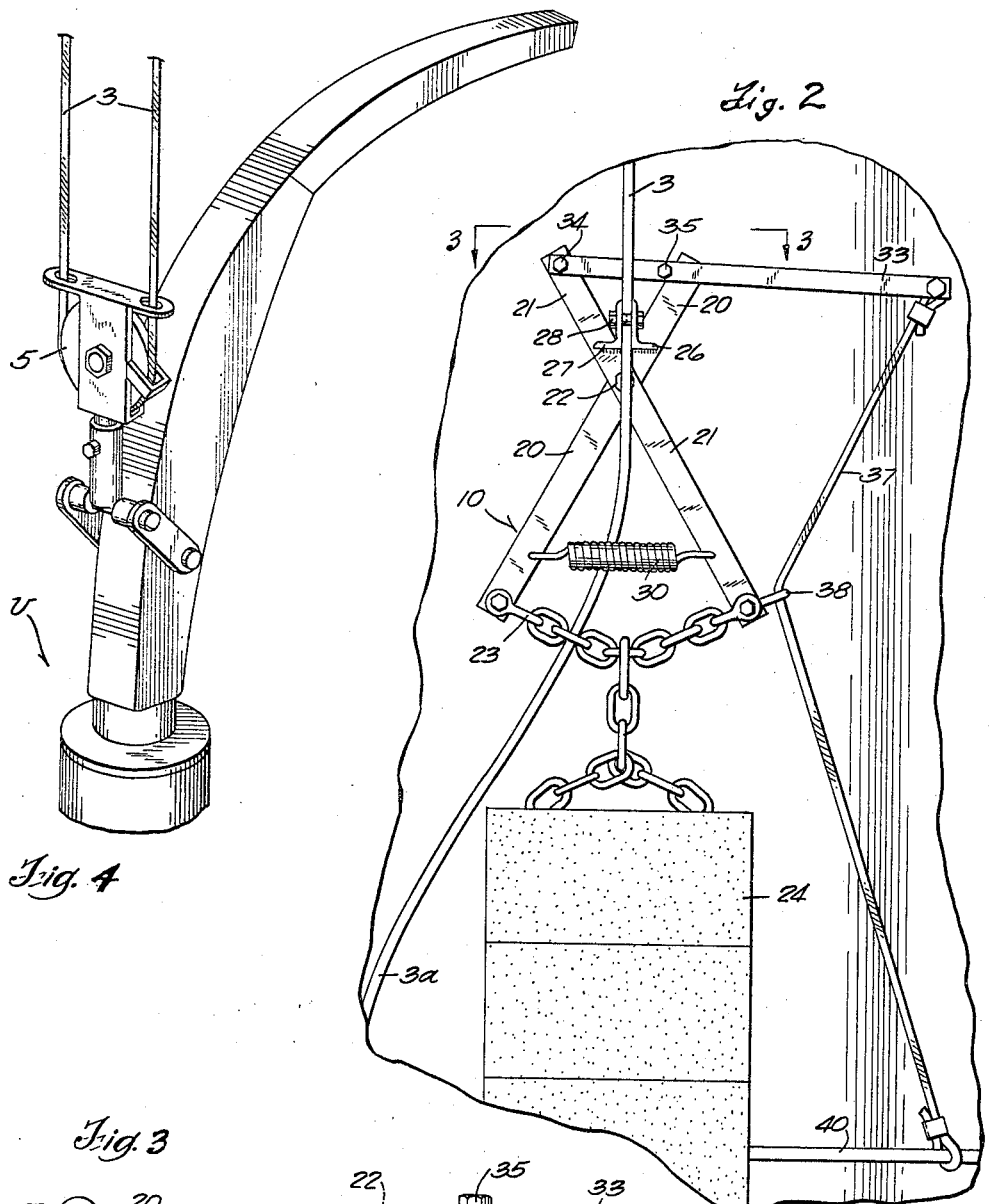

1

3,490,620
WEIGHT CONTROL MECHANISM FOR SILO UNLOADER
Paul Patz, Pound, Wis., assignor to Patz Company, Pound, Wis., a partnership
Filed Oct. 28, 1968, Ser. No. 770,916
Int. Cl. B65g 65/36
U.S. Cl. 214—17                                    8 Claims

ABSTRACT OF THE DISCLOSURE

Means for controlling the weight of a silo unloader to prevent the latter from "burying" itself in the ensilage on which it revolves within the silo. This means permits only the proper amount of weight of the unloader to be imposed on the ensilage, thus preventing the unloader from sinking too deeply into soft ensilage.

BACKGROUND OF THE INVENTION

This invention relates generally to silo unloaders of the type which are located within a silo, on top of ensilage, and which rotate around inside the silo to convey the ensilage radially inwardly toward the center of the silo and then convey it out of the silo and into the silo chute where it falls to the ground. The ensilage within the silo may be of varying conditions, that is to say it may be packed rather hard in spots or it may be comparatively soft and fluffy. As a result, the silo unloader when working in the relatively soft material, may tend to sink too deeply into the ensilage and thereby cause its radially extending conveyer to dig too deeply and consequently, "bury" the unloader. On the other hand, if the ensilage is hard, for example if it is frozen, it is desirable to have the entire weight of the unloader bear directly on the top of the ensilage to facilitate the cutting action on the radially extending conveyer. Specifically, the invention relates to a mechanism for controlling the amount of weight of the unloader which is permitted to rest on top of the ensilage and this mechanism provides an automatic control so that the proper weight of the unloader is imposed on the ensilage regardless of the condition or compactness of the ensilage.

The invention is applicable to unloaders of the type which are suspended from the roof of the silo or it is applicable to unloaders of the type which ordinarily simply rest on the top of the ensilage and are supported thereby. Examples of the latter type of unloaders are shown in the United States Patent No. 3,023,917, issued Mar. 6, 1962; No. 3,050,294, issued Aug. 21, 1962, which relates to the power cutter mechanism for cleaning the frozen ensilage from the silo wall; Patent No. 3,057,608 issued Oct. 9, 1962, and which relates to the construction of the gathering chain for such an unloader; Patent No. 3,065,867 issued Nov. 27, 1962, and which relates to a cleaning device for the wheels of such an unloader; and Patent No. 3,065,996 issued Nov. 27, 1962, and which relates to a clutch mechanism operable from outside of the silo for such an unloader.

SUMMARY OF THE INVENTION

The invention relates to a weight control mechanism for a silo unloader, which mechanism is fastened to a cable that partially or fully supports the silo unloader, and this mechanism functions to automatically feed out the proper amount of cable so as to permit the proper amount of weight of the unloader to be imposed on the top of the ensilage, regardless of the degree of compactness of the ensilage. Once the mechanism is adjusted, it needs no attention on the part of the operator and it insures that the unloader feeds the proper amount of ensilage as it rotates around the silo and prevents the unloader from digging too deeply into the ensilage.

These and other objects of the invention will appear as this disclosure progresses, reference being had to the accompanying drawings.

BRIEF DESCRIPTION OF THE DRAWINGS

FIGURE 1 is a perspective view of an unloader located within a silo and showing the weight control mechanism of the present invention mounted on the outside of the silo, certain parts of the silo being shown as removed or broken away for clarity;

FIGURE 2 is an enlarged, elevational view of the weight control mechanism shown in FIGURE 1;

FIGURE 3 is a sectional view taken generally along line 3—3 in FIGURE 2, but on an enlarged scale; and FIGURE 4 is an enlarged, perspective view showing the connection of the cable to an upper portion of the unloader.

DESCRIPTION OF THE PREFERRED EMBODIMENT

The unloader U shown within the silo S is of conventional character and may be of the type shown in the above mentioned patents. The weight of such unloaders is considerable and when working in soft ensilage, the center portion of conveyer C of the unloader may sink too deeply into the soft ensilage.

A tripod or supporting structure 1 is mounted on top of the silo wall W and has a pulley mechanism 2 suspended therefrom. A cable 3 is anchored at one end 4 to the pulley mechanism and extends downwardly around a pulley 5 (FIG. 4) secured to the unloader U, and then extends upwardly around the pulley mechanism 2 again from which it then extends downwardly along the side of the silo where it is releasably connected to the weight control mechanism 10, now to be described.

The mechanism 10 is located at a convenient height to an operator standing on the ground, and the mechanism generally remains at this height regardless of the vertical position of the unloader within the silo. The free end portion 3a of the cable 3 is long enough to permit the unloader U to descend to the bottom of the silo as the ensilage E therein is removed from the silo.

Generally, in operation the cable 3 passes automatically through the weight control mechanism 10 in an upward direction so as to permit the unloader U to be lowered within the silo, as follows.

The mechanism includes a pair of arms 20, 21 which are pivoted together at 22 to form a scissors mechanism. A chain 23 is connected across and between the lower ends of members 20, 21 and suitable weights 24, such as concrete blocks, are connected to the chain 23. A pair of openable jaws 26, 27 are provided for releasably grasping the cable 3, and these jaws are formed by an angle iron member 26 welded to arm member 20 and a similar but oppositely disposed angle iron member 27 welded to member 21. A pair of bolt means 28, 29 extend in spaced apart relationship through the angle iron members 26, 27, one on each side of cable 3, to thereby prevent the cable from sliding laterally out of the grasping relationship of the jaws 26, 27. The weight of the blocks 24 urge the scissors mechanism shut, that is toward the jaw closing position around the cable. A spring 30 located between the lower ends of arms 20, 21 is also provided for insuring rapid closing of the jaws once the jaws have been opened momentarily as will appear.

At the top of the scissors mechanism, a double lever 33 is pivoted at 34 to the upper end of arm 21, and a bolt means 35 extends through the double lever 33 and is adapted to slidingly bear against the inner surface of the upper end of arm 20. The free end of this double lever 33 is connected by an anchor rope 37, which rope then extends through a keeper ring 38 fixed on the lower end of arm 21, and the lower end of the anchor rope is secured to one of the steel hoops 40 located around the silo.

The above arrangement is such that the mechanism automatically opens when sufficient weight is imposed by the unloader on the cable. That is to say, when the unloader U has removed sufficient material from the silo so that its weight increases sufficiently on the cable, then the cable pulls upwardly, very slightly lifting the mechanism 10 with sufficient force to cause the anchored lever 33 and its bolt 35 to very momentarily spread the upper ends of the arms 20, 21 apart, thus opening the jaws 26, 27. This movement of the cable through the jaws is almost unnoticeable and occurs gradually and more or less evenly throughout the operation of the unloader, without any attention being required on the part of an operator.

The spring 30 has been found desirable to insure the immediate closing of the jaws after the cable has been moved slightly through the jaws in accordance with the tension on the cable. In other words, the spring 30 prevents the cable 3 from running wild through the mechanism 10 once the cable has started to move slightly relative to the mechanism.

The weight control mechanism provided by the present invention maintains a constant lifting tension on the silo unloader and takes the weight of the unloader off of the ensilage when it is desirable to do so. At the same time the mechanism allows the unloader to move downwardly in the silo at the proper speed depending on the condition of the ensilage.

I claim:

1. Weight control mechanism for a silo unloader including a pair of arms having a pivotal connection together intermediate their length, cable gripping jaws on said arms and located above said pivotal connection, said jaws being openable and closable as said arms pivot about their pivotal connection, said jaws adapted to releasably graps a cable passing therethrough and which cable is connected to said silo unloader, means connected to said arms and urging said arms to a jaw closing position, and an anchor means adapted to be secured to said silo and also connected to the upper end of said pivoted arms whereby as the said cable tends to move said arms upwardly due to the weight of said unloader, said anchor means causes momentary pivotal movement of said arms and consequent opening of the said jaws.

2. Mechanism as defined in claim 1 further characterized in that said anchor means comprises a lever pivoted to and adjacent the upper end of one of said arms, said lever being in sliding contact with the other of said arms and having a portion extending therefrom, and means for anchoring the extending portion of said lever to said silo, whereby said lever urges the upper ends of said arms apart and to a jaw opening position upon a predetermined amount of lifting force by said cable on said mechanism.

3. Mechanism as defined in claim 1 further characterized in that said means connected to said arms comprises weight means hanging between and from said arms, and also comprises a spring secured to and between said arms.

4. Mechanism as defined in claim 2 further characterized in that said means connected to said arms comprises weight means hanging between and from said arms, and also comprises a spring secured to and between said arms.

5. Weight control mechanism for a silo unloader including a pair of arms having a pivotal connection together intermediate their length and extending generally upwardly to terminate in free ends, a cable gripping jaw on each of said arms and located above said pivotal connection, said jaws being abuttable together when the free ends of said arms pivot about their pivotal connection and towards one another, said jaws adapted to releasably grasp a cable passing therethrough, said cable being connected to said silo unloader and extending upwardly where it is adapted to be trained over a pulley means carried on said silo, means connected to said arms adjacent their lower ends and urging said lower ends together to a jaw closing position, and an anchor means adapted to be secured to said silo and also connected to the upper free end of said pivoted arms whereby as the said cable tends to move said mechanism upwardly due to the weight of said unloader, said anchor means causes pivotal movement of said arms by urging said free ends apart and consequent opening of the said jaws.

6. Mechanism set forth in claim 5 further characterized in that said anchor means comprises a lever pivoted to and adjacent the upper end of one of said arms, said lever being in sliding contact adjacent to and with the upper end of the other of said arms, said lever having a portion extending laterally from said other arm, and means for anchoring the extending portion of said lever to said silo, whereby said lever urges the upper ends of said arms apart and to a jaw opening position upon a predetermined amount of lifting force by said cable on said mechanism.

7. Mechanism as defined in claim 5 further characterized in that said means connected to said arms comprises weight means hanging between and from said arms, and also comprises a spring secured to and between said arms.

8. Mechanism as defined in claim 6 further characterized in that said means connected to said arms comprises weight means hanging between and from said arms, and also comprises a spring secured to and between said arms.

References Cited

UNITED STATES PATENTS 3,204,786  9/1965  Kucera.
3,308,973  3/1967  Heitzman.

ROBERT G. SHERIDAN, Primary Examiner

U.S. Cl. X.R.

254—135, 178